US008756222B1

(12) United States Patent
Vyas et al.

(10) Patent No.: US 8,756,222 B1
(45) Date of Patent: Jun. 17, 2014

(54) SYSTEMS AND METHODS FOR CONFIDENCE-BASED SELECTION OF HIERARCHICAL LOCATIONS (71) Applicant: Google Inc., Mountain View, CA (US)

(72) Inventors: Anurag Vyas, Sunnyvale, CA (US); Krzysztof Duleba, Pfaffikon (CH); Finnegan Southey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 13/670,225

(22) Filed: Nov. 6, 2012

(51) Int. Cl.
G06F 17/30 (2006.01)
(52) U.S. Cl.
USPC .......................................... 707/722
(58) Field of Classification Search
USPC ................................. 707/722, 603
See application file for complete search history.

(56) References Cited

U.S. PATENT DOCUMENTS

| 6,684,250 | B2 * | 1/2004 | Anderson et al. ............. 709/225 |
| 7,000,015 | B2 * | 2/2006 | Moore et al. .................. 709/224 |
| 7,698,377 | B2 | 4/2010 | Parekh et al. |
| 7,711,846 | B2 | 5/2010 | Padmanabhan et al. |
| 8,364,816 | B2 * | 1/2013 | Guo et al. ..................... 709/225 |
| 2004/0078490 | A1 | 4/2004 | Anderson et al. |
| 2005/0086299 | A1 | 4/2005 | Ansell et al. |
| 2009/0138360 | A1 * | 5/2009 | Choti et al. ....................... 705/14 |
| 2009/0238079 | A1 * | 9/2009 | Gantenbein et al. .......... 370/241 |

FOREIGN PATENT DOCUMENTS

WO 2010044872 A1 4/2010

OTHER PUBLICATIONS

Agichtein et al., "Identifying 'Best Bet' Web Search Results by Mining Past User Behavior," ACM 2006, pp. 1-7.
Bennett et al., "Inferring and Using Location Metadata to Personalize Web Search," ACM 2011, pp. 1-10.

* cited by examiner

Primary Examiner — Joshua Bullock
(74) Attorney, Agent, or Firm — Bracewell & Giuliani LLP (57) ABSTRACT Provided are systems and methods for selecting a hierarchical location corresponding to a geographic location of a client computer. In some embodiments, a request for location information may be received from a client computer. The request may include a token that enables determination of geolocation data based on the token. The geolocation data may include a list of hierarchical locations, such as a postal code, a city, a state, and a county, and each hierarchical location may be associated with a confidence measure. The hierarchical locations may be iteratively traversed from smallest to largest. If the confidence measure of a selected hierarchical location is greater than a threshold, the hierarchical location may be provided as the location information. If the confidence measure of the selected hierarchical location is less than the threshold, the next hierarchical location may be selected and the associated confidence measure compared to the threshold.

22 Claims, 7 Drawing Sheets

SYSTEMS AND METHODS FOR CONFIDENCE-BASED SELECTION OF HIERARCHICAL LOCATIONS

BACKGROUND OF THE INVENTION

1. Field of the Invention

This invention relates generally to determining the location of a computer and, more particularly to processing hierarchical locations.

2. Description of the Related Art

Location-based applications and services may be accessed by users to obtain information specific to a user's location. Such location-based applications and services may determine the location of a computer (referred to as "geolocation"), such as a smartphone, laptop computer, and the like, and deliver information such as content, advertisements to a user based on the location. The location determinations may include geolocation to obtain the world geographic location of the computer. Some businesses employ geolocation techniques to learn more about customers such that the business can provide goods, services, content, and advertisements that may be of particular interest to the customers. For example, a website may employ geolocation techniques to identify the location of a person requesting to view a webpage, and deliver webpage content that may be of particular interest to persons in the location, such as local news, local maps, local advertisements and so forth.

In the context of the Internet, geolocation techniques often employ associating addresses of devices used to access the Internet with given locations. For example, an Internet Protocol (IP) address assigned to a computer may be associated with a given geographic location. Requests that are associated with the IP-address may be served with content that is associated with the given geographic location. Other locating techniques may include determining a geographic location from other information associated with a device or a user. However, in some instances the determination of a computer's location may be inaccurate, or the location may be at a higher level of granularity than desired for the location-based application or service. Additionally, the appropriate location, for the location-based application or service may not be selected and may not result in a user viewing the desired localized content, advertisements, etc.

SUMMARY OF THE INVENTION

Various embodiments of methods and systems for selecting a hierarchical location corresponding to a geographic location of a client computer are provided herein. In some embodiments, provided is a method for selecting a hierarchical location corresponding to a geographic location of a client computer. The method includes receiving, at one or more processors, a request for location information, the request comprising a token sufficient to geolocate the client computer, determining, by one or more processors, geolocation data based on the token, the geolocation data having a plurality of hierarchical locations, each hierarchical location of the plurality of hierarchical locations encompassing the location below it, and iteratively traversing, by one or more processors, the plurality of hierarchical locations from the smallest hierarchical location to the largest hierarchical location. Each iteration includes determining, by one or more processors, a confidence measure associated with a selected one of the plurality of hierarchal locations, comparing, by one or more processors, the confidence measure to a threshold, providing by one or more processors, the selected one of the plurality of hierarchical locations in response to the request for location information from the client computer if the confidence measure is greater than the threshold, and selecting, by one or more processors, a next hierarchical location of the plurality of hierarchical locations if the confidence measure is less than the threshold.

Additionally, a non-transitory tangible computer-readable storage medium having executable computer code stored thereon for selecting a hierarchical location corresponding to a geographic location of a client computer is provided. The code includes a set of instructions that causes one or more processors to perform the following: comprising a token sufficient to geolocate the client computer, determining, by one or more processors, geolocation data based on the token, the geolocation data comprising a plurality of hierarchical locations, each hierarchical location of the plurality of hierarchical locations encompassing the location below it, and iteratively traversing, by one or more processors, the plurality of hierarchical locations from the smallest hierarchical location to the largest hierarchical location. Each iteration includes determining, by one or more processors, a confidence measure associated with a selected one of the plurality of hierarchal locations, comparing, by one or more processors, the confidence measure to a threshold, providing by one or more processors, the selected one of the plurality of hierarchical locations in response to the request for location information from the client computer if the confidence measure is greater than the threshold, and selecting, by one or more processors, a next hierarchical location of the plurality of hierarchical locations if the confidence measure is less than the threshold.

Further, a system for selecting a hierarchical location corresponding to a geographic location of a client computer. The system includes one or more processors and a memory accessible by the one or more processors, the memory having computer code stored thereon. The code includes a set of instructions that causes one or more processors to perform the following: comprising a token sufficient to geolocate the client computer, determining, by one or more processors, geolocation data based on the token, the geolocation data comprising a plurality of hierarchical locations, each hierarchical location of the plurality of hierarchical locations encompassing the location below it, and iteratively traversing, by one or more processors, the plurality of hierarchical locations from the smallest hierarchical location to the largest hierarchical location. Each iteration includes determining, by one or more processors, a confidence measure associated with a selected one of the plurality of hierarchal locations, comparing, by one or more processors, the confidence measure to a threshold, providing by one or more processors, the selected one of the plurality of hierarchical locations in response to the request for location information from the client computer if the confidence measure is greater than the threshold, and selecting, by one or more processors, a next hierarchical location of the plurality of hierarchical locations if the confidence measure is less than the threshold.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As discussed in more detail below, provided in some embodiments are systems and methods for selecting a hierarchical location corresponding to a geographic location of a client computer. In some embodiments, a client computer may provide a token, such as an IP address, that may be used to geolocate the client computer. In other embodiments, other information associated with a user, client computer, or both may be used to geolocate the client computer. The geolocation determination may determine a list of hierarchical locations, ranging from a fine (e.g., smaller) hierarchical location to a coarse (e.g., larger) hierarchical location, such that each hierarchical location encompasses the locations below it. The hierarchical locations may include, for example, postal code, city, state, and country. Each hierarchical location may be associated with a confidence measure that indicates the probability that the client computer's location is within the geographical region identified by the hierarchical location.

After obtaining hierarchical locations and confidence measures associated with each hierarchical level, the hierarchical locations may be iteratively traversed from the finest (e.g., smallest) hierarchical location to the coarsest (e.g., largest) hierarchical location. Each hierarchical location may be compared to a confidence threshold. For example, the finest (e.g., smallest) hierarchical location may be selected, and the confidence measure associated with the finest (e.g., smallest) hierarchical location may be compared to the confidence threshold. If the confidence measure is above the confidence threshold, the selected hierarchical location may be selected as the location of the client computer. If the confidence measure is below the confidence threshold, the next hierarchical location, i.e., a coarser (e.g., larger) hierarchical location, may be selected. The next iteration may be performed by comparing the confidence measure associated with the next selected hierarchical location to a confidence threshold. In some embodiments, the confidence threshold may include a universal confidence threshold independent of the selected hierarchical level. In other embodiments, the confidence threshold may include a level-specific confidence threshold that is based on the selected hierarchical location. In yet other embodiments, the confidence threshold may be a query-specific or category-specific confidence threshold based on a search query received from a client computer or a categorization of one or more terms of the search query.

Figure 1:
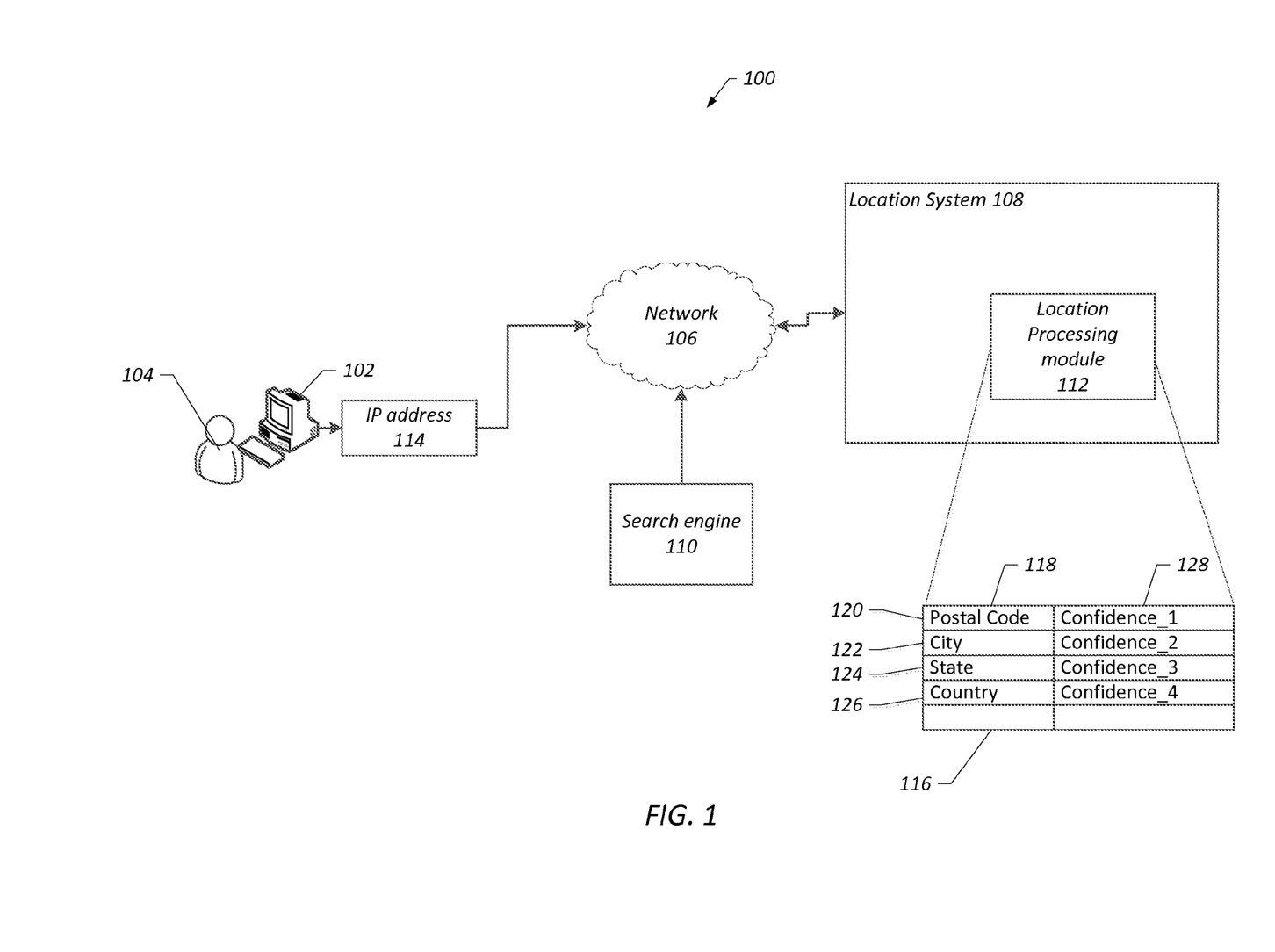
FIG. 1 is a schematic diagram of a system in accordance with an embodiment of the present invention.

FIG. 1 is a diagram that illustrates a system 100 in accordance with an embodiment of the present invention. As shown in FIG. 1, the system 100 may include a client computer 102 and a user 104 of the client computer 102. The system 100 also includes a network 106, a location system 108, and a search engine 110. The client computer 102, location system 108, and search engine 110 may communicate with each other over the network 106. For example, the client computer 102 may transmit data to and receive data from the location system 108 and the search engine 110. In some embodiments, the client computer 102 may include thick-clients, thin-clients, or both. The client computer 102 may include, for example, smartphones, tablet computers, laptop computers, desktop computers, etc. In some embodiments, the system 100 may include multiple client computers 102. Additionally, some embodiments may include a proxy, gateway, or other component located between the client computer 102 and other components of the system 100. For example, a router or mobile proxy computer may be located between the client computer 102 and the network 106. In other embodiments, the client computer 102 may access the network 106, the location system 108, or other components of the system 100 via a service provided by another entity.

The network 106 may include any element or system that facilitates communications between the components of system 100. The network 106 may include an electronic communication network, may include any suitable network, such as the Internet, an intranet, a local area network (LAN), a wide area network (WAN), a cellular communications network or any other suitable network, and may be a wireless or wired network. The network 106 may facilitate data exchange by way of packet switching using the Internet Protocol (IP). Network 106 may facilitate wired and/or wireless connectivity and communication. Network 106 may include a single network or combination of networks (e.g., the Interest and a cellular communications network) that facilitate communication between the components of system 100.

In some embodiments, the components of the system 100 may each be associated with a given Internet Protocol (IP) address. The IP-address may include an IPv4 IP-address, and IPv6 IP-address or the like. An IP-address may include a dedicated IP-address (e.g., a non-shared IP-address) or a shared IP-address. A network device may be associated with a dedicated IP-address that is unique to the given network device with respect to other IP-addresses on the network 106 such that the given network device may be uniquely addressed by other devices on network 106.

The location-based system 108 and the search engine 110 may each be implemented on a single server (in a discrete hardware component or as a virtual server) or multiple servers. Such servers may include web servers, application servers, or other types of servers. The servers may be, for example, computers arranged in any physical and virtual configuration, such as computers in one or more data processing centers, a distributed computing environment, or other configuration. Such configurations may use the network 106 for communication or may communicate over other networks The location system 108 may include a location processing module 112 that may determine the geographical location of a component of the system 100, such as by geolocation based on one or more tokens received from the client computer 102, information associated with a user of the client computer 102, information associated with the client computer, or a combination thereof. As used herein, the term "location" and "location information" may include the past, present, or future location of a component of the system 100, such as the past, present, or future location of the client computer 102.

In some embodiments, the location system 108 may provide geolocation of components based on IP addresses associated with the components (referred to as "IP address geolocation"). For example, location system 108 may obtain, access, and process IP-addresses and geolocation data corresponding to the IP-addresses to generate a mapping of IP-addresses to real-world physical/geolocations (e.g., geographic coordinates, a physical address, zip-code, city, state, country, continent, time zone or the like). Upon receiving request for geolocation data associated with a given IP-address, the location system may provide a geolocation associated with the IP-address based on the mapping. In some embodiments, the location system 108 may access other systems to determine the location of a component. For example, the location system 108 may access a WHOIS service to determine the registrant of an IP address or a database of mapped IP addresses. In some embodiments, IP-addresses and geolocation data are collected from requests received from access devices. In other embodiments, the location processing module 112 may determine the geographical location of a component based on other suitable location estimations, such as global positioning system (GPS) estimates, assisted GPS (A-GPS) estimates, Wi-Fi network location estimations, cell tower location estimations, and the like. Moreover, in some embodiments, the location estimations may include locations estimated from "check-ins" from location based services, paths traveled via navigation systems, locations shared on social networking services, etc.

In other embodiments, the location processing module 112 may determine the geolocate the client computer based on historical behavior associated with the client computer or a user of the client computer, such as searches, map views, business lookups, ads or web pages viewed, navigation systems, travel planning, locations mentioned in email, social network posts, and other communications, locations from photo or video imagery, geo-tagged data files such as images, purchases, payment system transactions, etc. In yet other embodiments, the location processing module may geolocate the client computer based on user preferences, such as locations (e.g., businesses) identified by user selections (e.g., bookmarks, "likes", "+1's", etc.) or otherwise distinguished locations, such as businesses or other addresses stored in a user's address book. Moreover, any combination of the location estimation techniques may be used.

The search engine 110 may receive requests, e.g., search queries, from the client computer 102 and provide search results based on such requests. The user 104 may input search queries to search for types of businesses or other entities, a specific business or entity, to search a geographic location, etc. For example, the client computer 102 may present a search web page or an interactive map to a user, and the user may input a geographical search query on the client computer 102 to search a geographical area. After receiving the inputted query, the client computer 102 may transmit a request 112 containing the query 110 to the servers 106. As described further below, the location of the computer 102, as determined by the location system 108, may be used to select, rank, and otherwise process search results based on the location. For example, in some embodiments, the search engine 110 may be a part of a geographic information system (GIS), and the search engine 110 may provide data from the GIS based on the user's location as determined by the location system 108.

As mentioned above, the location system 108 may determine the location of the client computer 102 based on various location estimation techniques. For example, in some embodiments, the location may be estimated from one or more tokens received from the client computer, such as an IP address 114 assigned to the computer 102. The location system 108 may obtain the IP address 114 during communication with the client computer 102, such as from a request received from the client computer 102. The location system 108 may then determine a list 116 of hierarchical locations 118 based on the client computer's IP address 114.

For the location of a computer 102, the location system 108 may determine a list of two, three, four, five, six, or more hierarchical locations. Each hierarchical location at a level may encompass the hierarchical locations at lower levels. For example, a list of hierarchical locations, from finest granularity to coarsest granularity, may include postal code, city, state, and country. The hierarchical locations may include a postal code, an official or colloquial neighborhood, a colloquial region, a city, a metropolitan area, an advertising region, a political district, a state, a province, a county, a parish, a country, or any other geographical area or combination thereof. The hierarchy may be based on any suitable order, such as finest to coarsest, smallest to largest, etc.

Additionally, the determination of each hierarchical location may include an associated confidence measure. The confidence measure for a hierarchical location may indicate the probability that the client computer's location is within the geographical region specified by the hierarchical location. Thus, a coarser hierarchical location of a list of hierarchical locations, such as a country, may have a higher confidence measure than a finer hierarchical location of the list of hierarchical locations. For example, the hierarchical locations 118 may include a postal code 120, a city 122, a state 124, and a country 126. Additionally, as described above, the hierarchical locations 118 may each include an associated confidence measure 128. For example, as shown in FIG. 1, the postal code 120 may be associated with a confidence measure of confidence__1. Thus, based on the IP address 114 of the client computer 102, confidence__1 is the probability that the client computer 102 is located in the postal code 120. Similarly, the city 122 may be associated with a confidence measure of confidence__2. Accordingly, based on the IP address 114 of the client computer 102, confidence__2 is the probability that the client computer 102 is located in the city 122. Similarly, the state 124 may be associated with a confidence measure of confidence__3, and the country 126 may be associated with a confidence measure of confidence__4 expressing the respective probabilities for these hierarchical locations.

Figure 2:
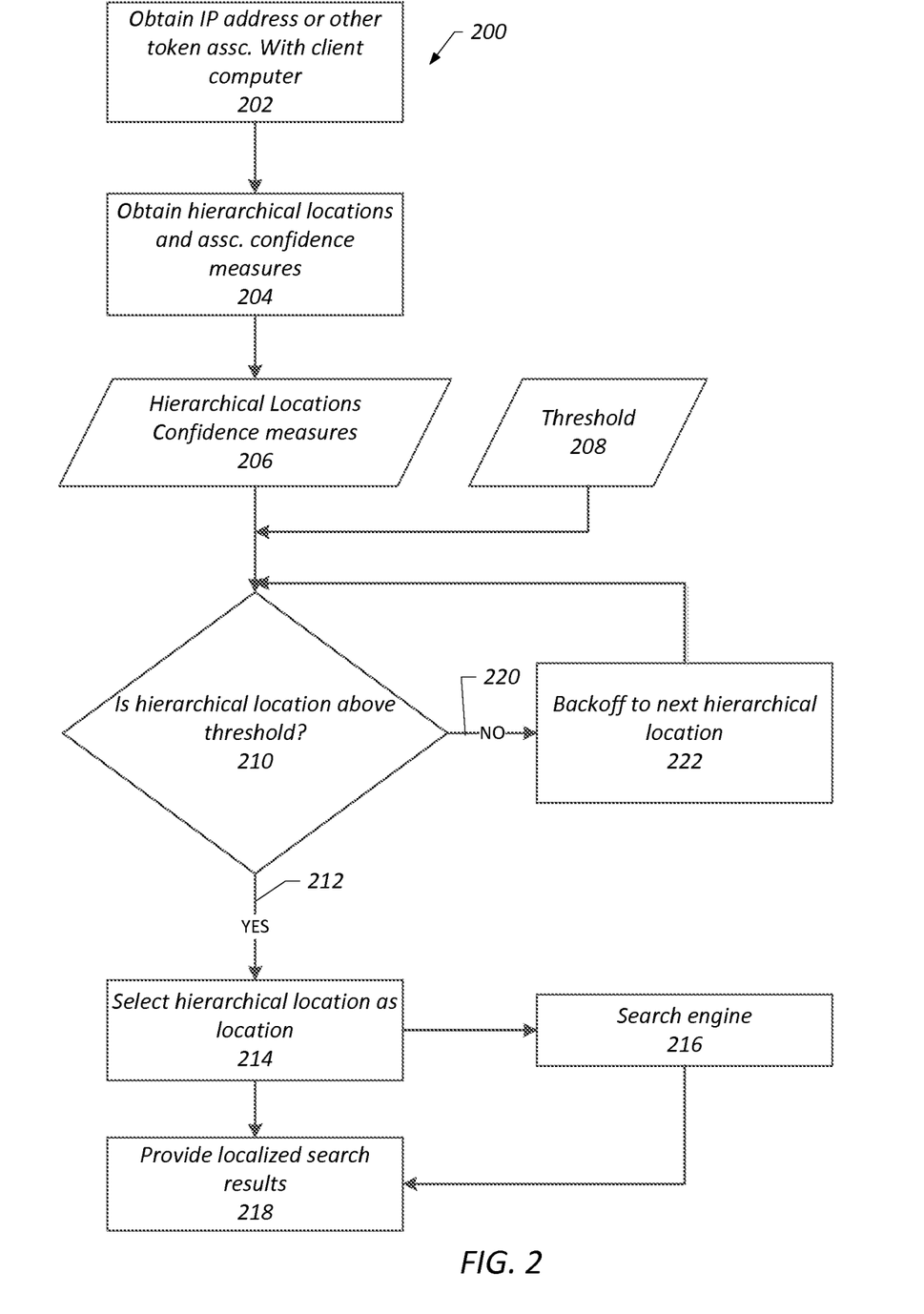
FIG. 2 is a block diagram of a process for selecting a hierarchical location based on a confidence threshold in accordance with an embodiment of the present invention.

FIG. 2 depicts a process 200 for selecting a hierarchical location based on a universal confidence threshold in accordance with an embodiment of the present invention. Initially, an IP address or other token associated with a client computer may be obtained (block 202). Based on the IP address or other location criteria, hierarchical locations and associated confidence measures for the hierarchical locations may be obtained (block 204), such as from the location estimation techniques described above. As described above, the hierarchical locations and confidence measures 206 may include a list of hierarchical locations of different granularities, ranging from, for example, a postal code at the finest granularity (i.e. lowest level) to a country at the coarsest granularity (i.e., highest level). Next, the finest (e.g., smallest) hierarchical location (i.e., the lowest level of the list of hierarchical locations) may be selected, and the confidence measure of the finest hierarchical location (i.e., the lowest level of the list of hierarchical locations), may be compared to the confidence threshold (decision block 210) to evaluate the hierarchical locations and select one of the hierarchical locations, as explained further below.

In some embodiments, the confidence threshold may be a universal confidence threshold. As used herein, the term "universal confidence threshold" refers to a confidence threshold that is compared to the confidence measures of multiple hierarchical locations and that is independent from and not based on the selected hierarchical location. In other embodiments, the threshold may include level-specific confidence thresholds. As used herein, the term "level-specific confidence threshold" refers to a confidence threshold that is based on the selected hierarchical location and is specific to a single hierarchical location (e.g., specific to a postal code, a state, a city, a country, etc.). For example, if the selected hierarchical location is a postal code, a confidence threshold specific to postal codes may be used, and the confidence measure of the postal code may be compared to the level-specific confidence threshold for postal codes. In another example, if the selected hierarchical location is a city, a confidence threshold specific to cities may be used, and the confidence measure of the city may be compared to the level-specific confidence threshold for postal codes.

In other embodiments, the threshold may include a query-specific confidence threshold or a category-specific confidence threshold. As used herein, the term "query-specific confidence threshold" refers to a confidence threshold that is specific to a search query, such as query for a specific business entity or a type of business entity. As used herein, the term "category-specific confidence threshold" refers to a confidence threshold that is specific to a category, such as a category for a search query or other term or group of terms. A search query may be obtained from the client computer, and a category for the search query may be obtained. In some embodiments, query terms may be mapped to various categories, and a category may be determined by looking up the query in pre-computed mapping of terms to categories. For example, categories of queries may include types of businesses, such as restaurants, bars, automotive repair, home repair, etc. A query-specific confidence threshold or a category-specific confidence threshold may include a universal confidence threshold, as described above, or may include level-specific confidence thresholds, as also described above.

If the confidence measure of the selected hierarchical location is above the confidence threshold (line 212), the selected hierarchical location may be selected as the location of the client computer (block 214). In some embodiments, the selected location may be provided to a search engine 216. Localized search results may be provided to the client computer based on the location of the client computer, (block 218), as determined from the selected hierarchical location. In some embodiments, the selected hierarchical location may be used as the location for providing other localized information, such as localized ads, localized interactive maps, etc.

In contrast, if the confidence measure of the selected hierarchical location is below the confidence threshold (line 220), the process 200 may "backoff" to a coarser (e.g., larger) hierarchical location, i.e., the next level of the hierarchical locations (block 222). The next hierarchical location may be selected, and the confidence measure of the selected hierarchical location compared to the confidence threshold (decision block 210), such as a universal threshold, a level-specific confidence threshold based on the selected hierarchical location, or a query-specific or category-specific confidence threshold. If the confidence measure of the selected hierarchical location is above the threshold (line 212), then this hierarchical location may be selected as the location of the client computer (block 218). In this manner, the process 200 may iteratively traverse to coarser (e.g., larger) hierarchical locations until a hierarchical location associated with a confidence measure above the universal confidence threshold is reached. For example, if the postal code of a list of hierarchical locations is associated with a confidence measure that is below the confidence threshold, the process 200 may backoff to a city, then to a state, and finally to a country until a hierarchical location associated with an adequate confidence measure is reached. In some embodiments, if none of the hierarchical levels are associated with confidence measure above the universal confidence threshold, then no location may be associated with the client computer. In such embodiments, localized search results may not be provided.

Figure 3:
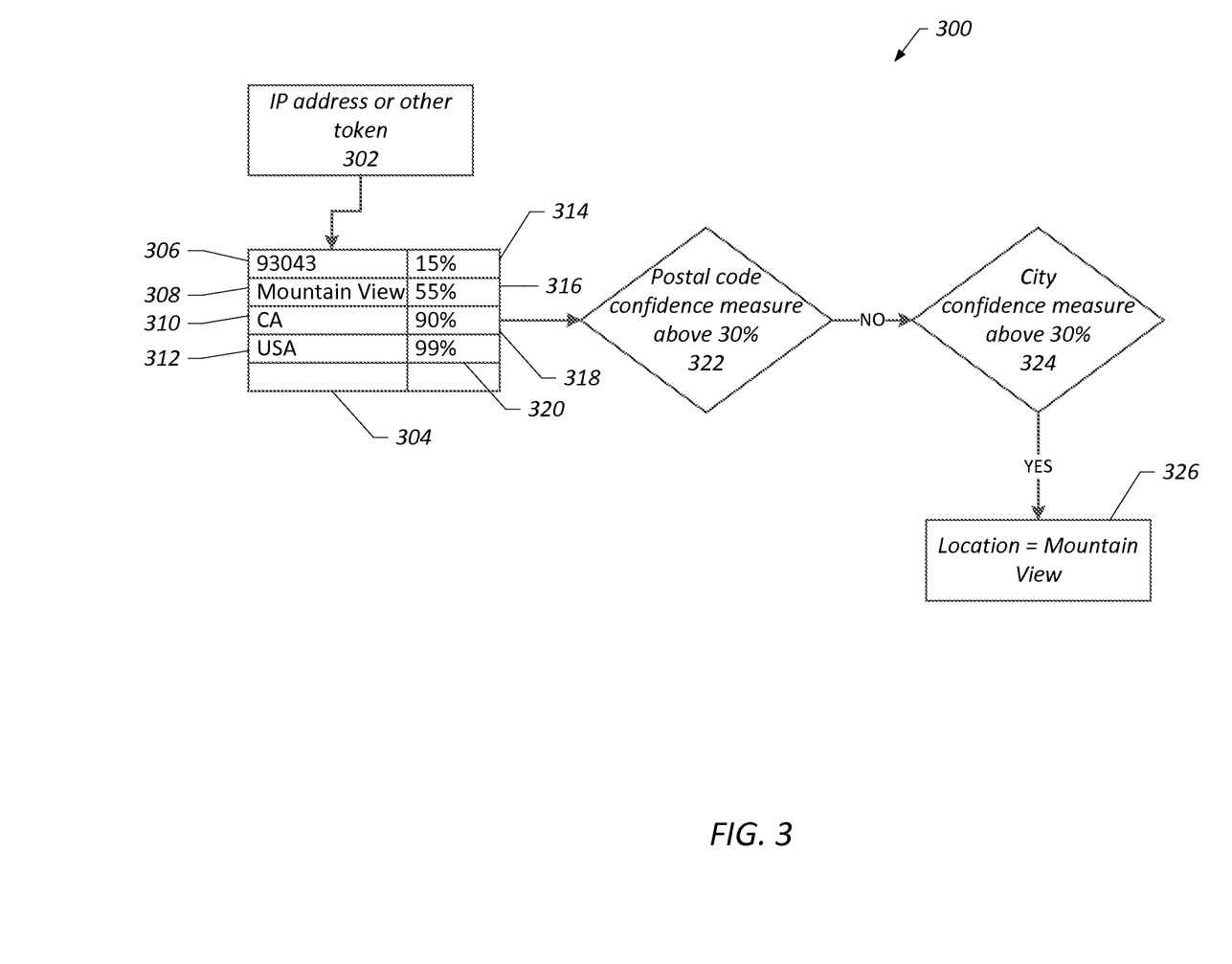
FIG. 3 is a block diagram of a process illustrating the selection of a hierarchical location based on a universal confidence threshold in accordance with an embodiment of the present invention.
Figure 4:
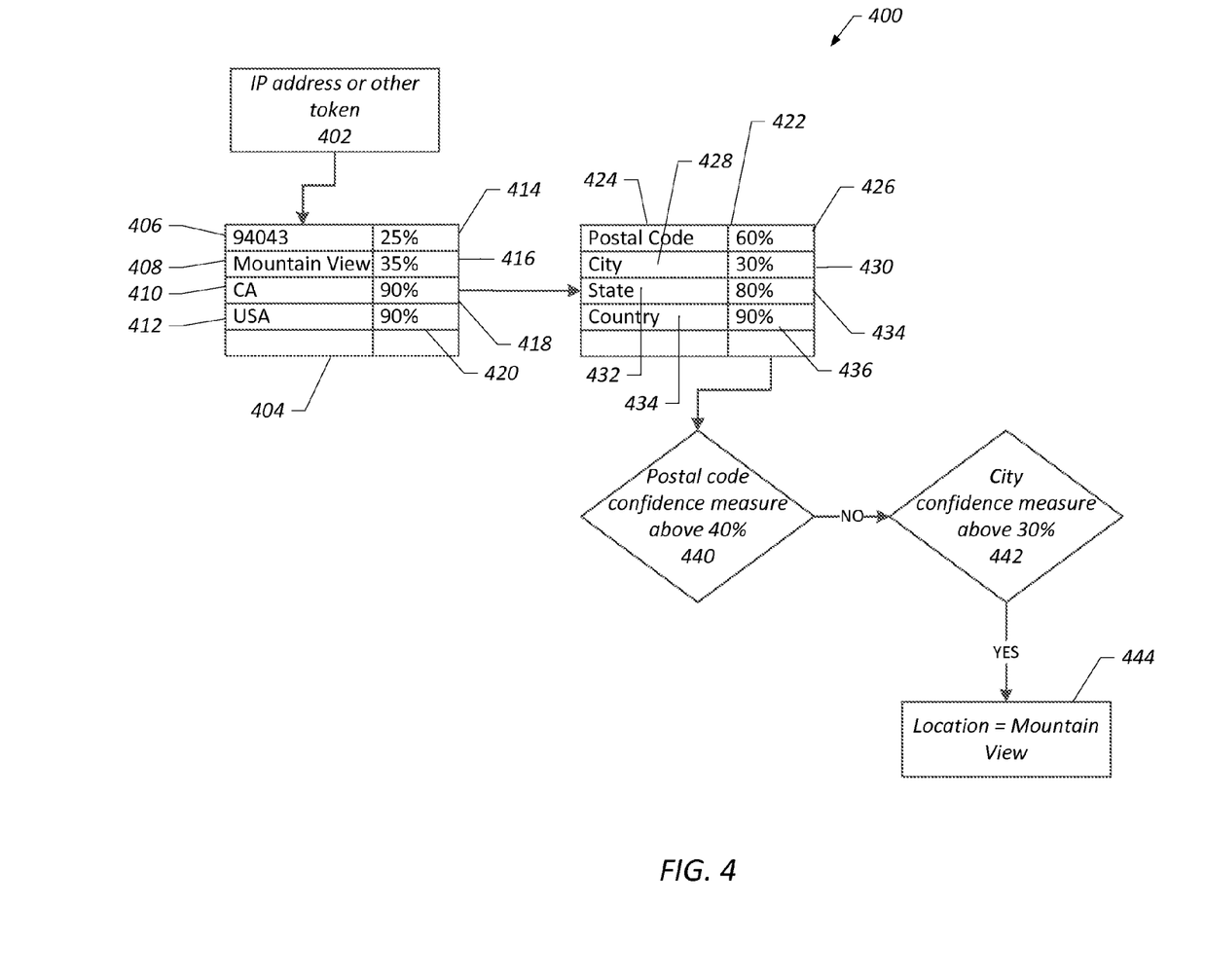
FIG. 4 is a block diagram of a process for selecting a hierarchical location based on a level-specific confidence threshold in accordance with an embodiment of the present invention.

FIG. 3 depicts a process flowchart 300 illustrating the selection of a hierarchical location based on a confidence threshold in accordance with an embodiment of the present invention. Initially, as described above, an IP address or other token associated with a client computer may be obtained (block 302). Next, as described above, a list 304 of hierarchical locations and associated confidence measures may be obtained. In some embodiments, the hierarchical locations may include a postal code 306, a city 308, a state 310, and a country 312. For example, as shown in FIG. 4, the hierarchical locations include the postal code 306 of "93043," the city 308 of "Mountain View," the state 310 of "CA," and the country 312 of "USA." Additionally, the hierarchical locations 306, 308, 310, and 312 are associated with respective confidence measures 314, 316, 318, and 320 indicating the probability that the client computer's location is within the respective hierarchical location. The postal code "93043" is associated with the confidence measure 314 of 15%. Additionally, the city "Mountain View" is associated with the confidence measure 316 of 55%. Similarly, the state "CA" is associated with a confidence measure 318 of 90%, and the country "USA" is associated with a confidence measure 320 of 99%.

Next, as mentioned above, the confidence measure associated with the selected hierarchical location may be compared to a universal confidence threshold. Initially, the finest hierarchical threshold (i.e., the lowest level of the list of hierarchical thresholds) may be compared to the universal confidence threshold. Accordingly, as shown in FIG. 3, the confidence measure 314 associated with the postal code "93043" may be compared to the universal threshold of 30% (decision block 322). However, as the confidence measure 314 of 15% for the postal code of "93043" is below the universal threshold of 30%, the selection of hierarchical locations may backoff to the next hierarchical location (i.e., the city "Mountain View"). Subsequently, the confidence measure associated with the city "Mountain View" may be compared to the universal confidence threshold of 30% (decision block 324). As the confidence measure of 55% for the city of "Mountain View" is above the universal confidence threshold of 30%, the city of "Mountain View" may be selected as the location of the client computer (block 326). As descried above, the selected location may be used to provide localized search results, localized ads, a map viewport, or other localized information.

FIG. 4 depicts a process flowchart 400 illustrating the selection of a hierarchical location based on a level-specific confidence threshold in accordance with an embodiment of the present invention. Initially, as described above, an IP address or other location criteria associated with a client computer may be obtained (block 402). Next, as described above, a list 404 of hierarchical locations and associated confidence measures may be obtained. In some embodiments, the hierarchical locations may include a postal code 406, a city 408, a state 410, and a country 412. For example, as shown in FIG. 4, the hierarchical locations include the postal code 406 of "94043," the city 408 of "Mountain View," the state 410 of "CA," and the country 412 of "USA." Additionally, the hierarchical locations 406, 408, 410, and 412 are associated with respective confidence measures 414, 416, 418, and 420 indicating the probability that the client computer's location is within the respective hierarchical location. As shown in FIG. 4, the postal code "94043" is associated with the confidence measure 414 of 25%. Additionally, the city "Mountain View" is associated with the confidence measure 416 of 35%. Similarly, the state "CA" is associated with the confidence measure 418 of 90%, and the country "USA" is associated with the confidence measure 420 of 99%.

Additionally, as mentioned above, level-specific confidence thresholds 422 may be obtained. As shown in FIG. 4, a postal code 424 may be associated with a confidence threshold 426 of 60%. Additionally, a city 428 may be associated with a confidence threshold 430 of 30%. Similarly, a state 432 may be associated with a confidence threshold 434 of 80%, and a country 436 may be associated with a confidence threshold 438 of 90%. Next, as mentioned above, the confidence measure associated with a selected hierarchical location may be compared to the level-specific confidence threshold for that hierarchical location.

Initially, the finest hierarchical threshold (i.e., the lowest level of the list of hierarchical thresholds) may be compared to a level-specific confidence threshold. Accordingly, as shown in FIG. 4, the confidence measure 414 associated with the postal code 406 of "93043" may be compared to the level-specific confidence threshold 426 of 40% (decision block 440). However, as the confidence measure 414 of 25% for the postal code 406 is below the level-specific confidence threshold 426 of 40%, the selection of hierarchical locations may backoff to the next hierarchical location (i.e., the city 408 of "Mountain View"). Subsequently, the confidence measure 416 associated with the city 408 of "Mountain View" may be compared to the level-specific confidence threshold 430 of 30% (decision block 442). As the confidence measure 430 of 35% for the city 408 of "Mountain View" is above the level-specific confidence threshold 426 of 30%, the city 408 of "Mountain View" may be selected as the location of the client computer (block 444).

Figure 5:
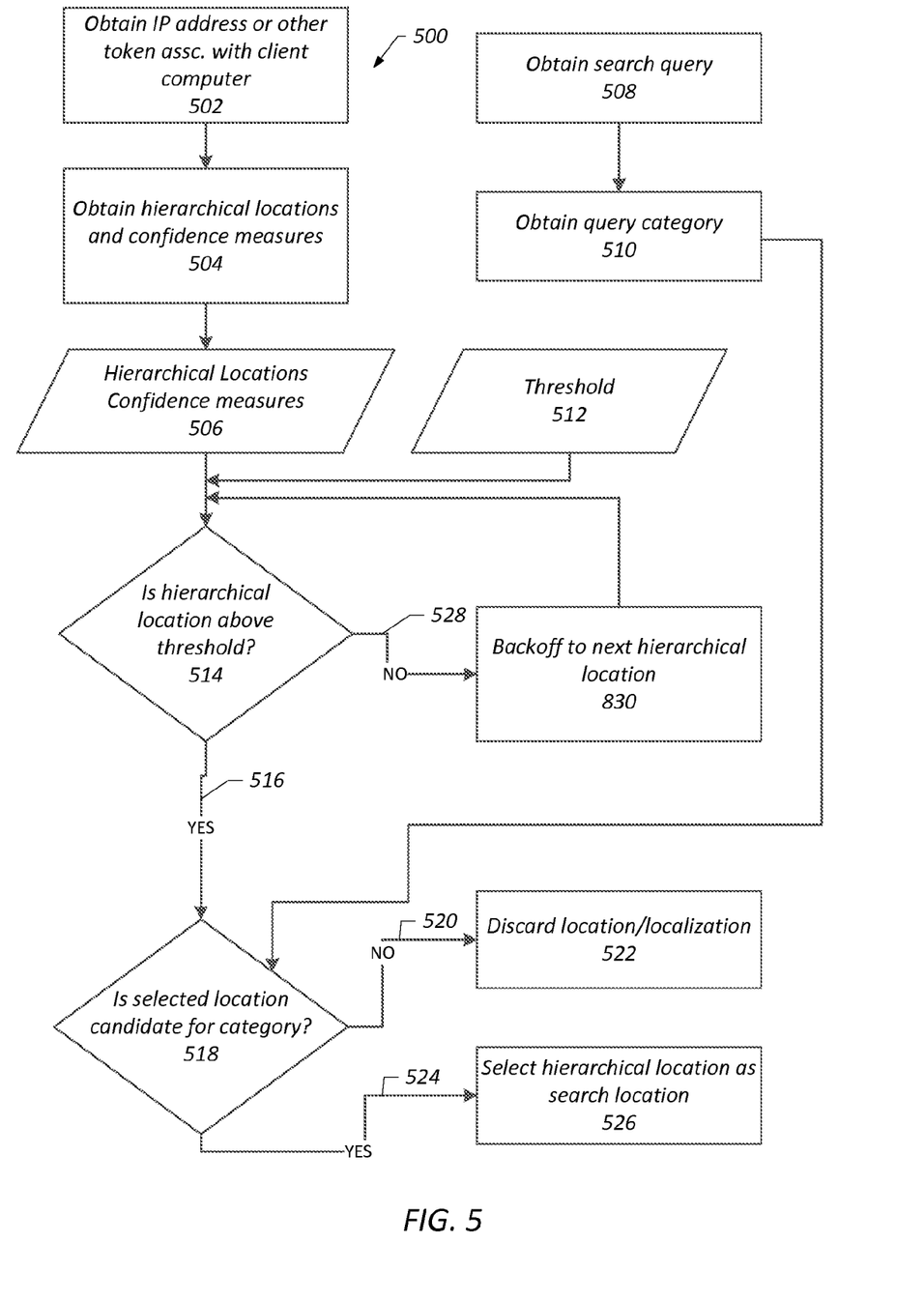
FIG. 5 is a block diagram of a process for selecting a hierarchical location based on a confidence threshold and category in accordance with an embodiment of the present invention.

In some embodiments, some search queries or types of search queries may not be suitable for certain hierarchical locations. For example, if the search query category is "pizza," providing localized results based on a state location may not be appropriate, as a user searching for pizza is likely interested in locations within a relatively short distance and short amount of driving time. FIG. 5 depicts a process 500 for selecting a hierarchical location based on a confidence threshold and query category in accordance with an embodiment of the present invention. Initially, as described above, an IP address or other token associated with a client computer may be obtained (block 502), and hierarchical locations and associated confidence measures for the hierarchical locations may be obtained (block 504), such as from the location estimation techniques described above. As described above, the hierarchical locations and confidence measures 506 may include a list of hierarchical locations of different granularities, ranging from, for example, a postal code at the finest granularity (i.e., lowest level) to a country at the coarsest granularity (i.e., highest level).

Additionally, a search query may be obtained (block 508), such as a search query input by a user and transmitted over a network. Next, in some embodiments, a category for the search query may be obtained (block 510). As noted above, in some embodiments, query terms may be mapped to various categories, and a category may be determined by looking up the query in pre-computed mapping of terms to categories. For example, categories of queries may include types of businesses, such as restaurants, bars, automotive repair, home repair, etc. Next, a confidence threshold 512 may be obtained and used to evaluate the hierarchical locations and select one of the hierarchical locations as the location of the client computer. The finest hierarchical location (i.e., the lowest level of the list of hierarchical locations) may be selected, and the confidence measure of the finest hierarchical location, may be compared to the confidence threshold 512 (decision block 514). In various embodiments, the confidence threshold 512 may include a universal confidence threshold or a level-specific confidence threshold.

If the confidence measure of the selected hierarchical location is above the universal threshold (line 516), the selected hierarchical location may be analyzed to determine if the query category to be suitable for query category (decision block 518). For example, query categories may be mapped to suitable hierarchical locations, the query category and selected hierarchical location may be compared to the mapped list to determine if a selected hierarchical location is a suitable location for a query category. If the selected hierarchical location is not suitable for the query category of the search query (line 520), the hierarchical location may be discarded and localization of search results may not be provided (block 522). In contrast, if the selected hierarchical location is suitable for the query category of the search query (line 524), the selected hierarchical location may be selected as the location of the client computer (block 526). As described above, this location may be used to provide localized search results to the client computer in response to the search query, or to provide localized advertisements.

If the confidence measure of the selected hierarchical location is below the universal threshold (line 528), the process 500 may backoff to a coarser hierarchical location, i.e., the next level of the list hierarchical locations (block 530). The next hierarchical location may be selected, and the confidence measure of the next selected hierarchical location compared to the universal confidence threshold (decision block 516). If the confidence measure of the selected hierarchical location is above the threshold (line 518), then this hierarchical location may compared to the suitable hierarchical locations for the query category (line 520). Thus, the process 500 may backoff to coarser hierarchical locations until a hierarchical location associated with a confidence measure above the confidence threshold and suitable for the category of the search query is reached.

Figure 6:
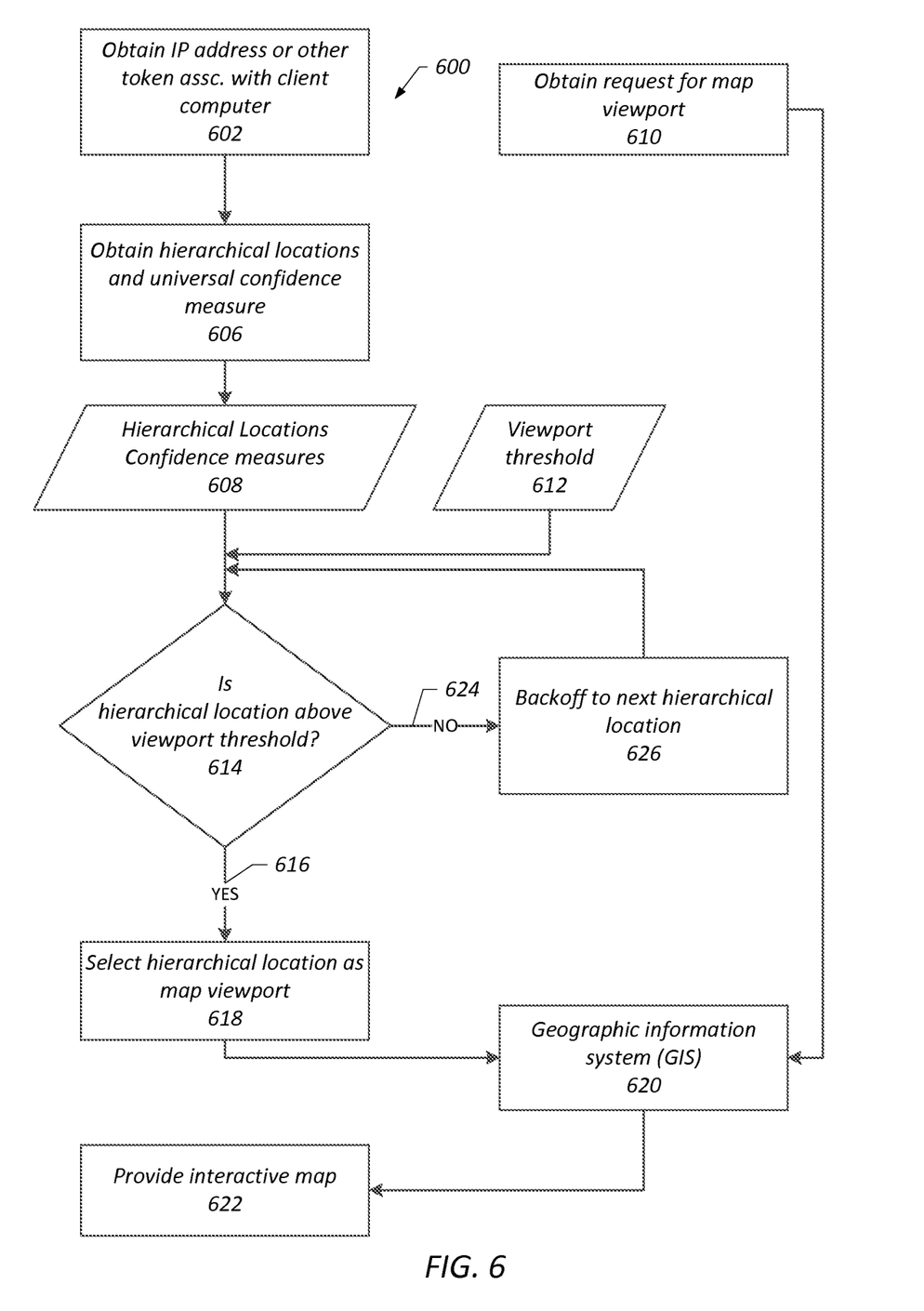
FIG. 6 is a block diagram of a process for selecting a map viewport based on a viewport threshold in accordance with an embodiment of the present invention.

In some embodiments, the hierarchical selection mechanism described above may be used to select a viewport for an interactive map. FIG. 6 depicts a process 600 for selecting a map viewport based on a viewport threshold in accordance with an embodiment of the present invention. Initially, as described above, an IP address or other token associated with a client computer may be obtained (block 602), and hierarchical locations and associated confidence measures for the hierarchical locations may be obtained (block 604), such as from the location estimation techniques described above. As described above, the hierarchical locations and confidence measures 606 may include a list of hierarchical locations of different granularities, ranging from, for example, a postal code at the finest granularity (lowest level) to a country at the coarsest granularity (highest level).

Additionally, a request for a map viewport may be obtained (block 610), such as from a user opening an interactive map application to view a geographic location. Next, a viewport confidence threshold 620 may be obtained and used to evaluate the hierarchical locations and select one of the hierarchical locations as the map viewport for requesting map information and displaying map information to the client. As described above, the finest hierarchical location (i.e., the lowest level of the list of hierarchical locations) may be selected, and the confidence measure of the finest hierarchical location, may be compared to the viewport confidence threshold (decision block 614). In various embodiments, the viewport confidence threshold 620 may include a universal confidence threshold, a level-specific confidence threshold, a query-specific confidence threshold, or a category-specific confidence threshold.

If the confidence measure of the selected hierarchical location is above the universal threshold (line 616), the selected hierarchical location may be selected as the viewport for the map request (block 618). For example, the selected hierarchical location may be provided to a geographic information system (GIS) 620 and used by the GIS 620 to as viewport such that map data (e.g., objects, attributes) for the viewport. Next, an interactive map based on the viewport may be provided (block 622), such as for display on the client computer.

If the confidence measure of the selected hierarchical location is below the universal threshold (line 624), the process 600 may "backoff" to a coarser hierarchical location, i.e., the next level of the list hierarchical locations (block 624). The next hierarchical location may be selected, and the confidence measure of the next selected hierarchical location compared to the viewport confidence threshold (decision block 626). If the confidence measure of the selected hierarchical location is above the threshold (line 616), then this hierarchical location may be selected as the viewport for the map data (line 618). Thus, the process 600 may backoff to coarser hierarchical locations until a hierarchical location associated with a confidence measure above the viewport confidence threshold is reached.

Figure 7:
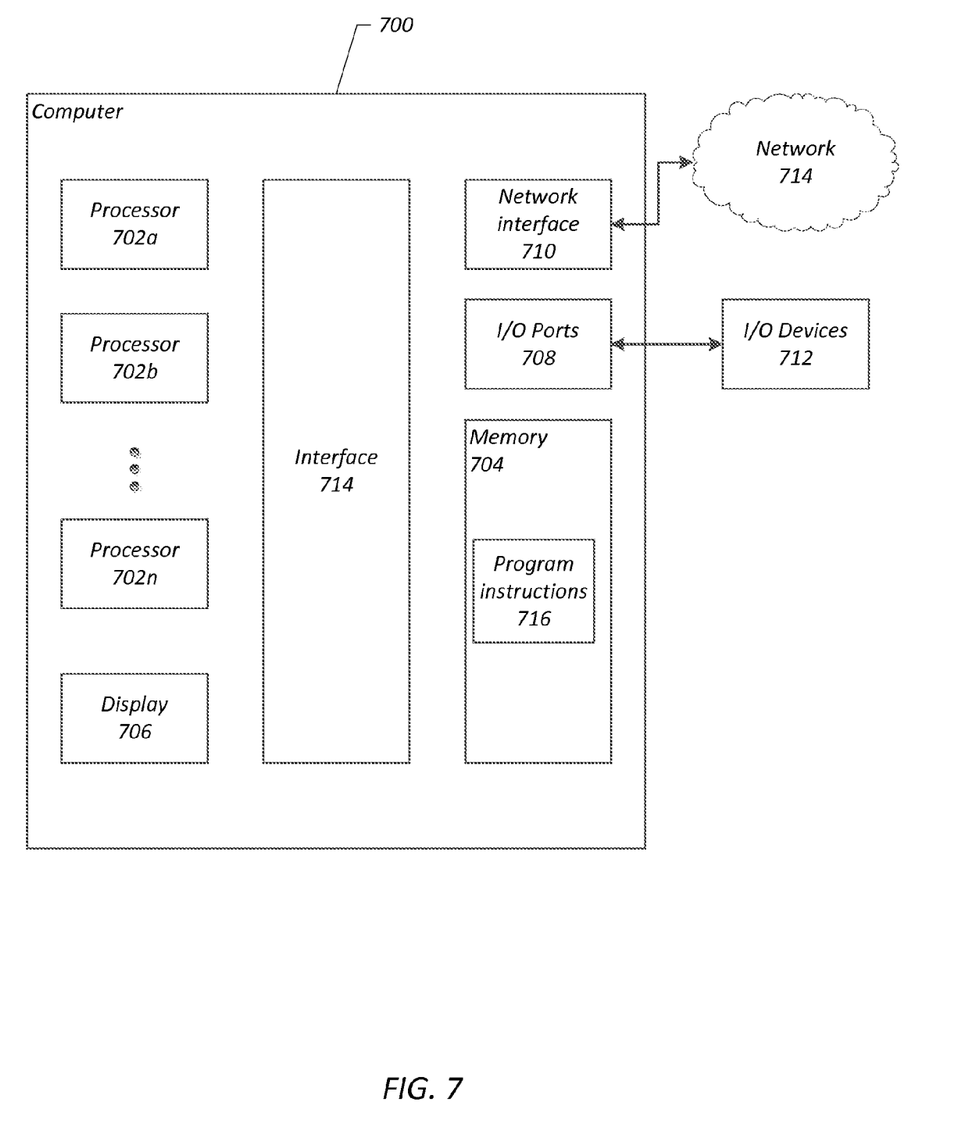
FIG. 7 is a block diagram of a computer in accordance with an embodiment of the present invention.

FIG. 7 depicts a computer 700 in accordance with an embodiment of the present invention. Various sections of systems and methods described herein, may include or be executed on one or more computers similar to computer 700. Further, processes and modules described herein may be executed by one or more processing systems similar to that of computer 700.

The computer 700 may include various internal and external components that contribute to the function of the device and which may allow the computer 700 to function in accordance with the techniques discussed herein. As will be appreciated, various components of computer 700 may be provided as internal or integral components of the computer 700 or may be provided as external or connectable components. It should further be noted that FIG. 7 depicts merely one example of a particular implementation and is intended to illustrate the types of components and functionalities that may be present in computer 700.

Computer 700 may include any combination of devices or software that may perform or otherwise provide for the performance of the techniques described herein. For example, computer 700 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 700 may be a unified device providing any one of or a combination of the functionality of a media player, a cellular phone, a personal data organizer, a game console, and so forth. Computer 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 700 may allow a user to connect to and communicate through a network 714 (e.g., the Internet, a local area network, a wide area network, etc.) and may provide communication over a satellite-based positioning system (e.g., GPS). For example, the computer 700 may allow a user to communicate using e-mail, text messaging, instant messaging, or using other forms of electronic communication, and may allow a user to obtain the location of the device from the satellite-based positioning system, such as the location on an interactive map. As shown in FIG. 7, the computer 700 may include one or more processors (e.g., processors 702a-702n) coupled to a memory 704, a display 706, I/O ports 708 and a network interface 170, via an interface 714.

In one embodiment, the display 706 may include a liquid crystal display (LCD) or an organic light emitting diode (OLED) display, although other display technologies may be used in other embodiments. The display 706 may display a user interface (e.g., a graphical user interface). The display 706 may also display various function and system indicators to provide feedback to a user, such as power status, call status, memory status, etc. These indicators may be in incorporated into the user interface displayed on the display 706. In accordance with some embodiments, the display 706 may include or be provided in conjunction with touch sensitive elements through which a user may interact with the user interface. Such a touch-sensitive display may be referred to as a "touch screen" and may also be known as or called a touch-sensitive display system.

The processor 702 may provide the processing capability required to execute the operating system, programs, user interface, and any functions of the computer 700. The processor 702 may include one or more processors, such as "general-purpose" microprocessors and general and special purpose microprocessors, such as ASICs. For example, the processor 702 may include one or more reduced instruction set (RISC) processors, such as those implementing the Advanced RISC Machine (ARM) instruction set. Additionally, the processor 702 may include single-core processors and multicore processors and may include graphics processors, video processors, and related chip sets. A processor may receive instructions and data from a memory (e.g., system memory 704). Accordingly, computer 700 may be a uni-processor system including one processor (e.g., processor 702a), or a multi-processor system including any number of suitable processors (e.g., 702a-702n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 704 (which may include tangible non-transitory computer readable storage mediums) may include volatile memory and non-volatile memory accessible by the processor 702 and other components of the computer 700. The memory 704 may store a variety of information and may be used for a variety of purposes. For example, the memory 704 may store application instructions, such as the firmware for the computer 700, an operating system for the computer 700, and any other programs or executable code necessary for the computer 700 to function. Program instructions 716 may be executable by a processor (e.g., one or more of processors 702*a*-702*n*) to implement one or more embodiments of the present techniques. Instructions 716 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 704 may be used for buffering or caching during operation of the computer 700.

As mentioned above, the memory 704 may include volatile memory, such as random access memory (RAM). The memory 704 may also include non-volatile memory, such as ROM, flash memory, a hard drive, any other suitable optical, magnetic, or solid-state storage medium, or a combination thereof. The memory 704 may store data files such as media (e.g., music and video files), software (e.g., for implementing functions on computer 700), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

The interface 714 may include multiple interfaces and may couple various components of the computer 700 to the processor 702 and memory 704. In some embodiments, the interface 714, the processor 702, memory 704, and one or more other components of the computer 700 may be implemented on a single chip, such as a system-on-a-chip (SOC). In other embodiments, these components, their functionalities, or both may be implemented on separate chips. The interface 714 may be configured to coordinate I/O traffic between processors 702*a*-702*n*, system memory 704, network interface 170, I/O devices 712, other peripheral devices, or a combination thereof. The interface 714 may perform protocol, timing or other data transformations to convert data signals from one component (e.g., system memory 704) into a format suitable for use by another component (e.g., processors 702*a*-702*n*). The interface 714 may include support for devices attached through various types of peripheral buses, such as a variant of the Peripheral Component Interconnect (PCI) bus standard or the Universal Serial Bus (USB) standard.

The computer 700 may also include an input and output port 708 to allow connection of additional devices. For example, the port 708 may be a headphone jack that provides for connection of headphones. Additionally, the port 708 may have both input/output capabilities to provide for connection of a headset (e.g. a headphone and microphone combination). Embodiments of the present invention may include any number of input and output ports 708, including headphone and headset jacks, universal serial bus (USB) ports, Firewire or IEEE-1394 ports, and AC and DC power connectors. Further, the computer 700 may use the input and output ports to connect to and send or receive data with any other device, such as other portable computers, personal computers, printers, etc. For example, in one embodiment the computer 700 may connect to a personal computer via a USB connection to send and receive data files, such as applications, media files, etc.

The computer 700 depicted in FIG. 7 also includes a network interface 170, such as a wired network interface card (NIC), wireless (e.g., radio frequency) receivers, etc. For example, the network interface 170 may receive and send electromagnetic signals and communicate with communications networks and other communications devices via the electromagnetic signals. The network interface 170 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 170 may communicate with networks (e.g., network 714), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 700 may be transmitted to computer 700 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for selecting a hierarchical location corresponding to a geographic location of a client computer, the method comprising:
   receiving, at one or more processors, a request for location information, the request comprising a token sufficient to geolocate the client computer;
   determining, by one or more processors, geolocation data based on the token, the geolocation data comprising a plurality of hierarchical locations, each hierarchical location of the plurality of hierarchical locations encompassing the location below it; and
   iteratively traversing, by one or more processors, the plurality of hierarchical locations from the smallest hierarchical location to the largest hierarchical location, each iteration comprising:
      determining, by one or more processors, a confidence measure associated with a selected one of the plurality of hierarchal locations;
      comparing, by one or more processors, the confidence measure to a threshold;
      providing by one or more processors, the selected one of the plurality of hierarchical locations in response to the request for location information from the client computer if the confidence measure is greater than the threshold; and
      selecting, by one or more processors, a next hierarchical location of the plurality of hierarchical locations if the confidence measure is less than the threshold.

2. The computer-implemented method of claim 1, wherein providing, by one or more processors, the selected one of the plurality of hierarchical locations in response to the request for location information from the client computer:
   determining, by one or more processors, search results based on the location information and a search query received from the client computer; and
   transmitting over a network, by one or more processors, the search results to the client computer for display by the client computer.

3. The computer-implemented method of claim 1, wherein the threshold is based on the selected one of the plurality of hierarchical locations.

4. The computer-implemented method of claim 1, wherein the threshold is based on a category of a search query received from the client computer.

5. The computer-implemented method of claim 1, wherein the threshold is independent from the selected one of the hierarchical locations.

6. The computer-implemented method of claim 5, wherein the token comprises an Internet Protocol (IP) address assigned to the client computer.

7. The computer-implemented method of claim 1, wherein the plurality of hierarchical locations comprises a postal code, a city, a state, a country, or any combination thereof.

8. The computer-implemented method of claim 1, wherein the request for location information comprises a request for a viewport of an interactive map.

9. The computer-implemented method of claim 8, wherein providing, by one or more processors, the selected one of the plurality of hierarchical locations in response to the request for location information comprises selecting the selected one of the plurality of hierarchical locations as the viewport for the interactive map.

10. The computer-implemented method of claim 1, comprising comparing the selected hierarchical location to a category location, wherein the category location comprises a location associated with a category of a search query received from the client computer.

11. The computer-implemented method of claim 10, comprising discarding the selected hierarchical location based on the comparison to the category location.

12. A non-transitory tangible computer-readable storage medium having executable computer code stored thereon for selecting a hierarchical location corresponding to a geographic location of a client computer, the code comprising a set of instructions that causes one or more processors to perform the following:
   receiving, at one or more processors, a request for location information, the request comprising a token sufficient to geolocate the client computer;
   determining, by one or more processors, geolocation data based on the token, the geolocation data comprising a plurality of hierarchical locations, each hierarchical location of the plurality of hierarchical locations encompassing the location below it;
   iteratively traversing, by one or more processors, the plurality of hierarchical locations from the smallest hierarchical location to the largest hierarchical location, each iteration comprising:
      determining, by one or more processors, a confidence measure associated with a selected one of the plurality of hierarchal locations;
      comparing, by one or more processors, the confidence measure to a threshold;
      providing by one or more processors, the selected one of the plurality of hierarchical locations in response to the request for location information from the client computer if the confidence measure is greater than the threshold; and
      selecting, by one or more processors, a next hierarchical location of the plurality of hierarchical locations if the confidence measure is less than the threshold.

13. The non-transitory computer-readable storage medium of claim 12, wherein providing, by one or more processors, the first hierarchical location in response to a request for geolocation information corresponding to the client computer comprises:
   determining, by one or more processors, search results based on the location information and a search query received from the client computer; and
   transmitting over a network, by one or more processors, the search results to the client computer for display by the client computer.

14. The non-transitory computer-readable storage medium of claim 12, wherein the threshold is based on the selected one of the plurality of hierarchical locations.

15. The non-transitory computer-readable storage medium of claim 12, wherein the threshold is based on a category of a search query received from the client computer.

16. The non-transitory computer-readable storage medium of claim 12, wherein the threshold is independent from the selected one of the hierarchical locations.

17. The non-transitory computer-readable storage medium of claim 12, wherein the plurality of hierarchical locations comprises a postal code, a city, a state, a country, or a combination thereof.

18. A system for selecting a hierarchical location corresponding to a geographic location of a client computer, the system comprising:
   one or more processors; and
   a memory accessible by the one or more processors, the memory having computer code stored thereon, the code comprising a set of instructions that causes one or more processors to perform the following:
      receiving, at one or more processors, a request for location information, the request comprising a token sufficient to geolocate the client computer;
      determining, by one or more processors, geolocation data based on the token, the geolocation data comprising a plurality of hierarchical locations, each hierarchical location of the plurality of hierarchical locations encompassing the location below it; and
      iteratively traversing, by one or more processors, the plurality of hierarchical locations from the smallest hierarchical location to the largest hierarchical location, each iteration comprising:
         determining, by one or more processors, a confidence measure associated with a selected one of the plurality of hierarchal locations;
         comparing, by one or more processors, the confidence measure to a threshold;
         providing by one or more processors, the selected one of the plurality of hierarchical locations in response to the request for location information from the client computer if the confidence measure is greater than the threshold; and
         selecting, by one or more processors, a next hierarchical location of the plurality of hierarchical locations if the confidence measure is less than the threshold.

19. The system of claim 18, wherein the threshold is based on the selected one of the plurality of hierarchical locations.

20. The system of claim 18, wherein the threshold is based on a category of a search query received from the client computer.

21. The system of claim 18, wherein the threshold is independent of the selected one of the hierarchical locations.

22. The system of claim 18, wherein the plurality of hierarchical locations comprises a postal code, a city, a state, a country, or a combination thereof.

* * * * *